United States Patent [19]

Krajewski

[11] 4,380,010
[45] Apr. 12, 1983

[54] PHASE DIRECTIONAL ANTENNA ARRAY AND PHASED RING COMBINER FOR RADIO DIRECTION FINDING

[75] Inventor: Zdzistaw A. A. Krajewski, Ajax, Canada

[73] Assignee: Bayly Engineering Limited, Ajax, Canada

[21] Appl. No.: 186,016

[22] Filed: Sep. 9, 1980

[30] Foreign Application Priority Data

Sep. 12, 1979 [CA] Canada .................... 335462

[51] Int. Cl.³ ............................................. G01S 3/06
[52] U.S. Cl. ................................ 343/113 R; 343/119
[58] Field of Search ........................... 343/113 R, 119

[56] References Cited

U.S. PATENT DOCUMENTS

| | | | |
|---|---|---|---|
| 3,104,391 | 9/1963 | Hansel | 343/113 R |
| 3,115,633 | 12/1963 | Kramar et al. | 343/113 R X |
| 3,946,395 | 3/1976 | Kirchhoff | 343/113 R |
| 4,197,542 | 4/1980 | Höfgen | 343/113 R X |

FOREIGN PATENT DOCUMENTS 1200894 9/1965 Fed. Rep. of Germany ...... 343/119

Primary Examiner—Malcolm F. Hubler
Attorney, Agent, or Firm—Wenderoth, Lind & Ponack

[57] ABSTRACT

A novel Direction Finding system is described, using a small aperture circular array of vertical dipoles, the outputs of which are rotated in phase by angles corresponding to their angular location on the array circle. A phased ring combiner is used to add the dipole pair outputs, giving two resultant waveforms, one advanced in phase and the other retarded by the same angle $\theta$, where $\theta$ is the relative bearing angle of the incoming signal. The phasing elements are made independent of the signal frequency either by the use of all-pass networks or by prior conversion to a fixed intermediate frequency. DF processing can be performed by a digital meter which computes the phase difference between the two resultant waveforms. In addition, an orthogonal DF display is available through a $\Sigma/\Delta$ conversion.

9 Claims, 4 Drawing Figures

PHASE DIRECTIONAL ANTENNA ARRAY AND PHASED RING COMBINER FOR RADIO DIRECTION FINDING

BACKGROUND OF THE INVENTION

This invention relates to direction finding systems.

When designing HF direction finding (DF) systems for shipborne or mobile applications, the prime restriction is the antenna size which must be necessarily small as compared with the received wavelength. However, a narrow aperture DF system has certain inherent drawbacks:

(1) Field strength sensitivity is poor, since only a small volume of the radiated space energy can be sampled.

(2) Reflections from nearby conducting bodies, particularly those at resonance, produce local distortions of the electromagnetic field which may extend over a radius of several wavelengths. A narrow aperture antenna can only measure the average field vector over its own base. Hence bearing errors will be shown depending on the frequency and the relative positions of the re-radiating bodies with respect to the antenna.

(3) Near-field components of the re-radiated field may be picked up by the antenna elements through direct electrostatic or electromagnetic coupling, the results combining with the far field effects of item (2) above.

(4) In contrast to the local re-radiations with errors which are constant for a given site, there are time-variable errors due to ionospheric reflections. The combined field vectors of the ground wave and the sky-wave produce wavefront corrugations which may be drifting slowly across the base of the antenna. Bearing angle displayed by a narrow aperture system will show periodic oscillations about its mean value.

(5) Polarization tilts of the electromagnetic wave array may also be a source of errors if the antenna elements are allowed to pick up the horizontal component of the field.

ANTENNA CONSIDERATIONS

Shipborne HF/DF antennas must be symmetrical around the axis of the mast. Traditionally, they have been constructed as crossed loops which provided adequate sensitivity, but suffered from errors due to horizontally polarized components of the field making it impractical to take bearings on skywaves, elevated targets and any other re-radiation effects causing tilts of the wavefront plane. Spaced-loop arrays, while immune to the polarization tilts, show a pronounced lack of sensitivity at the low end of the spectrum since their effective height varies proportionally with the square of frequency.

Within the dimensional constraints of the antenna base this leaves a choice of pairs of vertical dipoles or Adcock elements which have the advantage of rejecting the horizontal component of the field and yet retain a sensitivity comparable to that of the crossed loops. Diametrically opposed pairs are preferred for balancing-out of mast-induced currents, the array consisting of 2N dipoles or N pairs equally spaced around the circle. N can be any number greater than 2. In practice the number of dipoles will be limited by spacing errors on one hand and by cost and inter-element coupling on the other. An eight-element array is a practical compromise for the shipborne LF/HF bands.

In a Watson-Watt configuration, such an array acts as a sine/cosine resolver of the vertically polarized component of the field. The ensuing output has to be processed by a twin-channel receiver with closely matched amplitude and phase characteristics. Signal strength of the DF channels varies with the bearing angle for the two DF receiver channels, passing through a zero on one, while reaching a maximum on the other. For weak signals the signal to noise ratio is quite different for the two channels, making it harder to process the bearing angle from the amplitude ratio of the two channels. In addition, a sense signal is required to be amplified by a third, phase-matched, receiver channel further adding to the complexity and cost of the system.

SUMMARY OF THE INVENTION

The impact of limitations of the narrow aperture is minimized in the present invention which makes the best use of the available parameters in the critical areas, achieving what is believed to be a cost effective compromise. The guidelines leading to this design can be summarized as follows:

(a) Construct an antenna array to utilize the maximum volume available.

(b) Select antenna elements to respond to the vertical polarization component of the field while rejecting the horizontal component.

(c) Collect all the available energy from all the antenna elements on a fulltime basis.

(d) Process the data continuously to give an instantaneous bearing readout (minimum one cycle of the intermediate frequency).

(e) Provide time integration, weighted or otherwise, to take care of the high noise and fading conditions.

This description is limited to details of the novel elements or concepts. A brief mention is made of those parts of the DF system which follow conventional design.

THE PHASE-DIRECTIONAL ANTENNA ARRAY

In the present invention, the outputs of the successive dipole pairs are shifted in phase so as to add cumulatively at the output terminals of the phasing networks. All the field energy picked up by the antenna array is utilized, regardless of the direction of arrival of the signal. This type of array is phase-directional, translating the bearing angle into an electrical phase angle, positive or negative, displayed between the two outputs of the phasing network. The magnitude of the phase angle is measured to represent the bearing while sense is obtained from the relative sign of the phase.

Thus, in accordance with a broad aspect of the invention, there is provided a radio direction finding system for determining the relative bearing angle $\theta$ of an incoming signal comprising a circular array of an even number of vertical dipoles arranged in diametrically opposed pairs equally spaced apart around the array, each dipole pair having an output feeding two branches, one branch electrically advancing the phase of a signal from each dipole pair by an amount equivalent to the angular displacement in one direction of each dipole pair with respect to a reference direction established by a reference dipole pair and the other branch retarding the phase of a signal from each dipole pair by an amount equivalent to said angular displacement, means for combining all the phase advanced signals to form a signal voltage $V_d$ which is retarded in phase by an angle $\theta$ corresponding to said relative bearing, means for combining all the phase retarded signals to form a signal voltage $V_s$ which is advanced in phase by said angle $\theta$, and means for measuring the phase difference ($2\theta$) between $V_d$ and $V_s$ whereby $\theta$ is obtainable by dividing said phase difference by 2.

BRIEF DESCRIPTION OF THE DRAWING

The invention will now be described in further detail in conjunction with the accompanying drawings, in which:

FIG. 1 shows an array of dipole pairs AE, BF, CG, etc. spaced by an angle $\pi/N$ where N is an integer corresponding to the total number of dipole pairs. Let $\theta$ be the bearing angle of the field velocity vector with reference to the axis AE. Then the EMF induced in the pair AE is given by $$V_o = 2V \sin(A \cos \theta) \sin \omega t$$

where
V = Eh = peak EMF induced in each dipole
A = $\pi d/\lambda$ = angular phase shift of the incoming wave over half the array diameter
$\omega$ = angular frequency of the incoming wave For the k-th dipole pair, rotated by the angle $k\pi/N$, the EMF becomes $$V_k = 2V \sin\left[A \cos\left(\theta - \frac{k\pi}{N}\right)\right] \sin \omega t$$

where k can have integral values from 0 to N−1.

Now, let the output of each pair be shifted electrically by a phase angle of $k\pi/N$ so that $$V_k = 2V \sin\left[A \cos\left(\theta - \frac{k\pi}{N}\right)\right] \sin\left(\omega t - \frac{k\pi}{N}\right)$$

and the sum of all such phased outputs added together becomes $$V_s = \sum_{k=0}^{k=N-1} V_k =$$

$$\sum_{k=0}^{k=N-1} 2V \sin\left[A \cos\left(\theta - \frac{k\pi}{N}\right)\right] \sin\left(\omega t - \frac{k\pi}{N}\right)$$

For a small aperture, a linear approximation may be taken and the expression simplifies to $$V_s = \sum_{k=0}^{k=N-1} 2VA \cos\left(\theta - \frac{k\pi}{N}\right) \sin\left(\omega t - \frac{k\pi}{N}\right) \text{ or}$$

-continued
$$V_s = NVA \sin(\omega t - \theta)$$

Supposing now the outputs of the dipole pairs are displaced electrically in the opposite direction, corresponding to a phase angle of $-k\pi/N$. Then the sum of such phased outputs for N dipole pairs around the circle becomes $$V_d = \sum_{k=0}^{k=N-1} 2V \sin\left[A \cos\left(\theta - \frac{k\pi}{N}\right)\right] \sin\left(\omega t + \frac{k\pi}{N}\right)$$

or, simplified for a small aperture $$V_d = NVA \sin(\omega t + \theta)$$

If both phase-shifted outputs are obtained simultaneously, a phase meter applied between $V_s$ and $V_d$ will show an angle of $2\theta$ and the sense ambiguity can be resolved by considering the relative sign of the phase difference.

PHASED RING COMBINER

Each dipole pair of the phase-directional antenna array has to contribute to two outputs, $V_s$ and $V_d$ via appropriate phase shifting networks: one in advance and the other in retard with respect to the reference plane. This can be accomplished in a single network by cascading the phase-shifting elements with the dipole pairs feeding in at the consecutive junctions.

Figure 1:
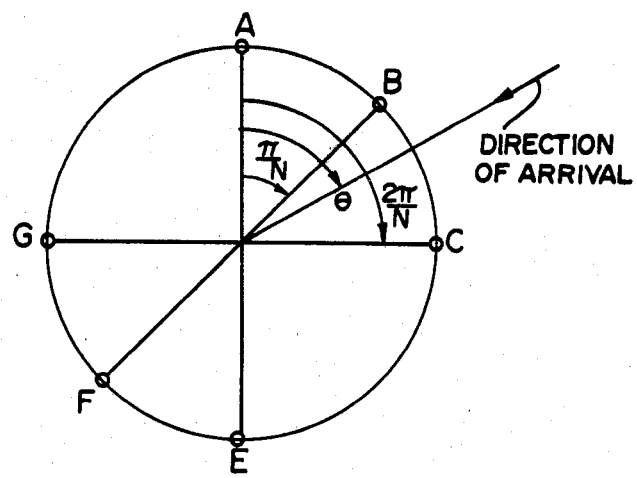
FIG. 1 is a schematic representation of a phase-directional antenna array useful in explaining the invention.
Figure 2:
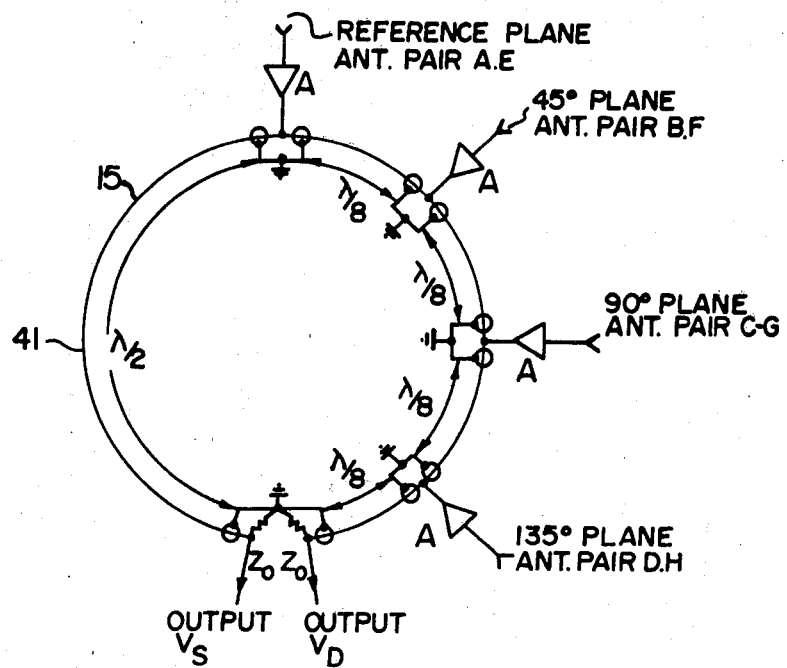
FIG. 2 is a schematic illustration of a ring combiner which may be used in the present invention.

For a given frequency of the incoming wave, the phasing network can take the form of a transmission line tapped at points corresponding to the required phase shifts. This arrangement is illustrated in FIG. 2 where four antenna pairs, A-E, B-F, C-G and D-H, spaced at 45° around a circle, are connected to a transmission line ring 15 at intervals of $\frac{1}{8}$th of a wavelength. The total length of the line 15 is one full wavelength and the line is terminated at either end in its characteristic impedance Zo. Signals from the individual dipole pairs are fed into the line 15 via identical amplifiers A which provide high output impedance so that reflections obtained along the line at each junction become negligible.

The Antenna pair AE, corresponding to the reference plane is connected to the 180° point on the line, equidistant from both outputs. A signal from the reference antenna reaches outputs $V_s$ and $V_d$ in-phase after a delay of 180°. This is the reference phase. Signals from the next antenna pair (BF) will reach output $V_s$ after 225° but output $V_d$ after only 135°. Similarly signals from antenna pair CG will reach $V_s$ after 270° and $V_d$ after 90°, etc.

Thus, output $V_s$ combines all the antenna signals with phase delays corresponding to the physical shift angles of the respective antenna pairs while output $V_d$ combines the signals with the respective phase advances.

Conditions of operation of the phase-directional antenna array are thereby satisfied.

In a practical circuit the output line terminations Zo are made part of the phase measuring equipment.

A narrow band of input frequencies can be accomodated in the above arrangement by replacing the transmission line sections with networks displaying constant phase over the frequency band in question.

Figure 3:
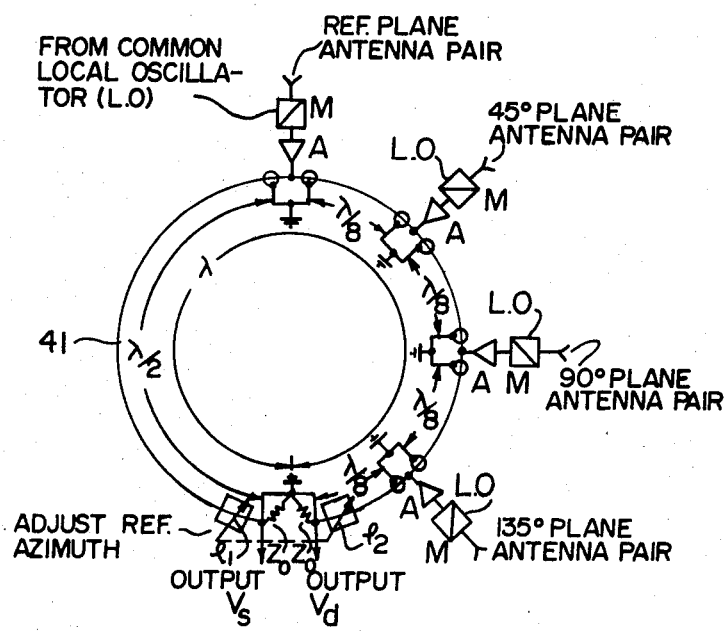
FIG. 3 is a schematic illustration of a modification of the arrangement of FIG. 2.

For wide band surveillance, the amplifiers A are preceded by identical frequency converters M (FIG. 3)

supplied from a common variable local oscillator frequency and adjusted to be matched in phase. The frequency of the incoming signals is thus converted to a constant, intermediate frequency where the converter outputs can be combined in the fashion described above.

Exact physical alignment of the antenna array is always difficult. It is convenient, therefore, to provide for an electrical adjustment of the reference or zero azimuth. FIG. 3 shows an intermediate frequency type Phased Ring Combiner fitted out with azimuth reference adjustment $\phi_1$ and $\phi_2$ ganged so that $\phi_1 + \phi_2 =$ constant, i.e., when $\phi_1$ is increased, $\phi_2$ is decreased by the same amount. The total phase shift around the ring means remains at 360° and the lengths of transmission line connecting to the networks $\phi_1$ and $\phi_2$ both have to be shortened by the maximal amount of swing of $\phi_1$ or $\phi_2$.

Full ±180° zero azimuth adjustment can be also provided by extending the ring perimeter to 2λ, and inserting two 0-180 variable phase shifters, one before each terminal end of the ring. It will be noted that the ring perimeter must be an integral number of wavelengths.

The theory of the small aperture phase-directional array and ring combiner applies also to a circular array of individual dipoles in place of the diametrical dipole pairs described above. However, there are practical reasons for preferring the paired elements arrangement:

(i) There is a better assurance of balancing out horizontal components of the field before reaching the active elements of the circuit as by connecting dipole pairs to form Adcock antennas.

(ii) The number of matched amplifier/mixer channels is reduced by half.

(iii) The number of phasing sections is also reduced by half.

DF PROCESSING AND DISPLAY

Outputs $V_s$ and $V_d$ of the phased ring combiner have to be amplified in a matched pair of selective receivers, tuned to the ring frequency and provided with band pass filters to accept the wanted signal while eliminating external interference. Phase matching of the receiver channels is important because it directly influences the accuracy of the measured bearing. Either a channel commutation technique or a self-balancing network by sample injection may be employed to reduce the phase mismatch error.

Alternatively, the voltages $V_s$ and $V_d$ may be used to modulate a single carrier, which can be then amplified in a conventional, single channel receiver and demodulated to recover the amplified components with the original phase shift.

In either case, the amplified signals have to be applied to the input of a phase meter, which will measure the phase $2\theta$ between them and divide it by 2 in order to obtain the DF bearing. Such a phase meter may conveniently be of digital type with a clock frequency designed to display the bearing angle to the desired accuracy. A time averaging control may be added to overcome the effects of fading.

In addition to the digital bearing display, it may be convenient to present an analog, cathode ray tube display of the Watson-Watt type. For this purpose the amplified signals $V_s$ and $V_d$ are passed through a sum and difference network to give two orthogonal voltages $V_y$ and $V_x$ so that $V_y/V_x = \tan \theta$. Correct sense indication for the CRT display should be obtained from an omnidirectional voltage $V_o$ derived from the average of all the dipole element outputs. This can be applied directly to the grid of the cathode ray tube in order to blank out the undesirable half of the trace. Within the bandwidth constraints of the receiver, this analog display will show all the familiar patterns associated with the crossed Adcock DF system, giving the advantage of instantaneous visual recognition of noise background, modulation, interference and of multiple signals at closely spaced frequencies inside the band.

Intelligence content of the signal may be derived by demodulating $V_s$ or $V_d$, the amplitude of either being independent of the bearing angle $\theta$.

EXAMPLE OF A RADIO DF SYSTEM

Figure 4:
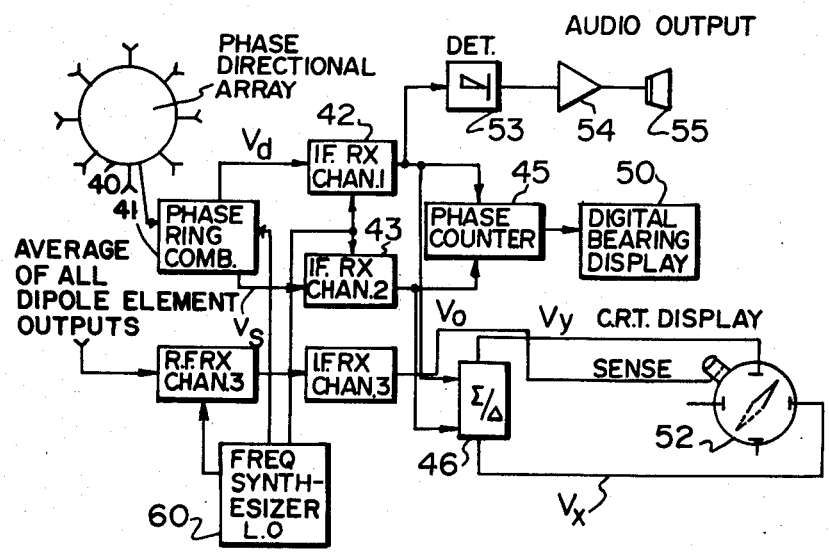
FIG. 4 is a block diagram of a direction finding system using a phase-directional array.

Application of a phase-directional array and ring combiner in a radio DF system can be illustrated typically in FIG. 4.

In this example an eight element array 40 is shown connected to the phased ring combiner 41 which supplies outputs $V_s$ and $V_d$ at the first intermediate frequency to phase-matched twin channel receivers 42 and 43. The receiver outputs are fed in parallel to a phase counter 45 and to a sum and difference network 46. The phase counter 45 provides pulses for an LED type digital bearing display 50, while the sum and difference network 46 carries out the conversion to a pair of orthogonal signals $V_y$ and $V_x$ for display on a cathode ray tube 52. Two additional outputs are taken from the receiver: from channel 3 ($V_o$) to the Z-modulation of the CRT (sense signal), and from channel 1 ($V_d$) to the detector 53, audio amplifier 54 and loud speaker 55. A common frequency synthesizer 60 is used for supplying the last local oscillator frequency to the frequency converters of the ring combiner and the other local oscillator frequencies necessary for the twin-channel i.f. receiver.

Other applications are conceivable, such as that using a single-channel receiver or any extensions of the system aimed at improved accuracy of the DF bearing measurement or at simplified surveillance facilities.

APPLICATIONS AND ADVANTAGES

The phase directional array is a narrow aperture system and as such is limited to applications where the array diameter is a fraction of the wavelength. Typical examples include LF through HF ranges for shipborne and for mobile DF. Axial symmetry of the array permits its location on a cylindrical mast which is essential for both of the above applications.

The advantages of the present system in the above application can be divided as those due to the antenna array and due to the bearing processor and display. The phase-directional array offers the following points of merit:

(i) rejection of the horizontal polarization component reduces errors due to sky-wave propagation, polarization tilts and reception with a high angle of incidence.

(ii) independence of the sense information from the effect of mast currents.

(iii) instantaneous response i.e. no scanning or time-sampling delays involved.

(iv) field strength sensitivity comparable with that of a crossed-loop system.

In addition, the processing and display system associated with the phase-directional array offers the simultaneous advantage of:

(i) digital bearing accuracy is not dependent on the amplitude matching of the two DF receiver channels. Only accurate phase matching is essential (ii) digital bearing readout for display and transmission to a remote location (iii) analog cathode ray tube display for fast tuning in and recognition of nature of signal and the conditions of reception (iv) simultaneous display of bearings of two or more signals of different frequencies inside the selected i.f. band As a partial disadvantage may be counted the inability to resolve the direct rays from those locally reflected, resulting in certain residual errors to be corrected by calibration.

What is claimed is:

1. A radio direction finding system for determining the relative bearing angle $\theta$ of an incoming signal comprising a circular array of an even number of vertical dipoles arranged in diametrically opposed pairs equally spaced apart around the array, each dipole pair having an output feeding two branches, one branch electrically advancing the phase of a signal from each dipole pair by an amount equivalent to the angular displacement in one direction of each dipole pair with respect to a reference direction established by a reference dipole pair and the other branch retarding the phase of a signal from each dipole pair by an amount equivalent to said angular displacement, means for combining all the phase advanced signals to form a signal voltage $V_d$ which is retarded in phase by an angle $\theta$ corresponding to said relative bearing, means for combining all the phase retarded signals to form a signal voltage $V_s$ which is advanced in phase by said angle $\theta$, and means for measuring the phase difference ($2\theta$) between $V_d$ and $V_s$ whereby $\theta$ is obtainable by dividing said phase difference by 2.

2. A system as claimed in claim 1 wherein said branches are formed by a phased ring combiner comprising a chain of phase shifting networks connected in cascade, each dipole pair output being connected to a different junction between adjacent networks, each network providing a signal phase shift corresponding to the angular displacement between adjacent dipole pairs except for the reference dipole pair which is connected to a first network providing a 180° phase shift and the last dipole pair which is connected to a last network providing a phase shift of 180° minus the angular displacement of said last dipole pair from said reference direction, the first and last networks having outputs which provide said voltages $V_s$ and $V_d$ to said means for measuring the phase difference.

3. A system as claimed in claim 2 wherein each network is formed of a section of transmission line having a length selected to give a desired phase shift.

4. A system as claimed in claim 3 wherein each dipole pair is connected to a junction via a frequency converter so that all incoming waves are reduced to a single intermediate frequency for which said ring can be tuned.

5. A system as claimed in claim 4 wherein each converter is followed by an amplifier of high output impedance to reduce losses and reflections around the ring.

6. A system as claimed in claim 5 wherein each converter/amplifier combination is of adjustable phase so that it may be phase matched at the signal frequency in the dipole pairs.

7. A system as claimed in claim 2 wherein the phase shifts of the first and last networks are adjustable whereby their phase shifts may be adjusted in opposite directions for zero reference while maintaining total phase shift around the ring equal to 360°.

8. A system as claimed in claim 7 wherein the first and second networks are each extended to provide a multiple of 180° additional phase shift whereby a large range of zero reference adjustment is available while still retaining total phase shift around the ring as a multiple of 360°.

9. A system as claimed in any one of claims 1 to 8 wherein said dipole pairs are connected as Adcock antennas.

* * * * *